United States Patent
Fischlein et al.

(10) Patent No.: US 8,364,346 B2
(45) Date of Patent: Jan. 29, 2013

(54) METHOD AND DEVICE FOR ROLL STABILIZATION OF A MOTOR VEHICLE

(75) Inventors: Hartmut Fischlein, Korntal-Muenchingen (DE); Robert Ferger-Andrews, Vaihingen/Enz (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 805 days.

(21) Appl. No.: 12/102,276

(22) Filed: Apr. 14, 2008

(65) Prior Publication Data

US 2008/0262675 A1 Oct. 23, 2008

(30) Foreign Application Priority Data

Apr. 12, 2007 (DE) .......................... 10 2007 017 242

(51) Int. Cl.
*B60G 17/016* (2006.01)
*B60G 23/00* (2006.01)
*B62C 3/00* (2006.01)
*B62K 25/00* (2006.01)
*G06F 7/00* (2006.01)
*G06F 17/00* (2006.01)
*G06F 14/00* (2006.01)

(52) U.S. Cl. ............................................ 701/38; 701/72
(58) Field of Classification Search ................ 701/38, 701/72
See application file for complete search history.

(56) References Cited

U.S. PATENT DOCUMENTS

| 4,974,875 A | 12/1990 | Sugasawa et al. |
| 5,046,008 A | 9/1991 | Dieter |
| 5,488,562 A | 1/1996 | Otterbein et al. |
| 7,832,518 B2 * | 11/2010 | Warner ................... 180/233 |
| 2002/0013645 A1 * | 1/2002 | Badenoch ................ 701/37 |
| 2004/0176890 A1 * | 9/2004 | Acker et al. ............. 701/38 |
| 2005/0023789 A1 * | 2/2005 | Suzuki et al. ........ 280/124.106 |

(Continued)

FOREIGN PATENT DOCUMENTS

| DE | 41 17 897 C2 | 12/1992 |
| DE | 10 2004 004 336 A1 | 8/2005 |

(Continued)

OTHER PUBLICATIONS

German Search Report dated Jan. 17, 2008 including English translation (Nine (9) pages).

(Continued)

*Primary Examiner* — Thomas H. Tarcza
*Assistant Examiner* — Imran Mustafa
(74) *Attorney, Agent, or Firm* — Leydig, Voit & Mayer, Ltd.

(57) ABSTRACT

A method and device for roll stabilization of a motor vehicle are provided. On the basis of a measured transverse acceleration or a calculated transverse acceleration of the motor vehicle, actuating signals are generated for actuators which are associated with a front axle and a rear axle of the motor vehicle and which provide support torques on the front axle and/or on the rear axle for roll stabilization. To ensure a satisfactory self-steering effect of the motor vehicle, a torque distribution between the support torque provided on the front axle and the support torque provided on the rear axle is modified on the basis of a first signal which allows conclusions to be drawn concerning the actuation of a gas pedal, and/or on the basis of a second signal which allows conclusions to be drawn concerning the actuation of a brake pedal.

5 Claims, 1 Drawing Sheet

U.S. PATENT DOCUMENTS

| | | |
|---|---|---|
| 2005/0197746 A1 | 9/2005 | Pelchen et al. |
| 2006/0037803 A1* | 2/2006 | Mori .............................. 180/233 |
| 2006/0192354 A1* | 8/2006 | Van Cayzeele ............ 280/5.506 |

FOREIGN PATENT DOCUMENTS

| | | |
|---|---|---|
| DE | 10 2004 047 860 A1 | 4/2006 |
| EP | 0 236 947 A2 | 9/1987 |
| EP | 0 246 655 A1 | 11/1987 |
| EP | 1 213 163 A2 | 6/2002 |
| JP | 60-191812 A | 9/1985 |
| JP | 2179525 A | 7/1990 |
| JP | 5-169948 A | 7/1993 |
| JP | 5169948 A | 7/1993 |
| JP | 2890667 B2 | 5/1999 |
| JP | 11-147411 A | 6/1999 |
| WO | WO 2006/037678 A1 | 4/2006 |
| WO | WO 2007/118588 A1 | 10/2007 |

OTHER PUBLICATIONS

European Search Report dated Aug. 13, 2008 w/English translation of pertinent portion (four (4) pages).

* cited by examiner

METHOD AND DEVICE FOR ROLL STABILIZATION OF A MOTOR VEHICLE

CROSS REFERENCE TO RELATED APPLICATIONS

This application claims the priority of German Application No. 10 2007 017 242.9, filed Apr. 12, 2007, the disclosure of which is expressly incorporated by reference herein.

BACKGROUND AND SUMMARY OF THE INVENTION

The invention relates to a method and device for roll stabilization of a motor vehicle wherein on the basis of a measured transverse acceleration or a calculated transverse acceleration of the motor vehicle, actuating signals are generated for actuators that are associated with a front axle and a rear axle of the motor vehicle and provide support torques on the front axle and/or on the rear axle for roll stabilization of the motor vehicle.

The driving characteristics of a motor vehicle are determined by a number of forces and torques which act on the motor vehicle in the direction of the vehicle axes, namely, in the direction of a longitudinal axis, a transverse axis, a vertical axis, and a roll axis. The roll axis is understood to mean an axis extending through roll centers of the front axle and the rear axle of the motor vehicle. A rolling motion of the motor vehicle about the roll axis is referred to as roll. To provide satisfactory driving characteristics of a motor vehicle, it is known from the prior art to implement roll stabilization on the motor vehicle. Roll stabilization based on the driving state is characterized in that, for example, by a measured transverse acceleration or a calculated transverse acceleration of the motor vehicle, actuating signals are generated for actuators which are associated with the front axle and the rear axle of the motor vehicle and which provide support torques on the front axle and/or on the rear axle for roll stabilization. The actuators are typically hydraulically displaceable stabilizers, which may be actuated by valve blocks. The valve blocks receive actuating signals from a control and regulation device, which on the basis of the measured or calculated transverse acceleration of the motor vehicle generates the actuating signals.

In the known roll stabilization, as previously stated, support torques are provided on the front axle and/or on the rear axle for roll stabilization, in which a torque distribution between the support torque provided on the front axle and the support torque provided on the rear axle influences the so-called self-steering effect of a motor vehicle.

When the motor vehicle is subjected to alternate loads, the self-steering effect of the motor vehicle may change such that a desired user-friendly driving characteristic of the motor vehicle can no longer be ensured. No method or device for roll stabilization of a motor vehicle is known, heretofore, which addresses this problem.

Proceeding from this situation, the object of the present invention is to provide a novel method and a novel device for roll stabilization of a motor vehicle.

According to the invention, to ensure a satisfactory self-steering effect of the motor vehicle, a torque distribution between the support torque provided on the front axle and the support torque provided on the rear axle is modified on the basis of a first signal which allows conclusions to be drawn concerning the actuation of a gas pedal or increased drag torque, and/or on the basis of a second signal which allows conclusions to be drawn concerning the actuation of a brake pedal.

Within the scope of the present invention, for the first time a method for roll stabilization of a motor vehicle is provided, in which to ensure a satisfactory self-steering effect of the motor vehicle, the torque distribution between the support torque provided on the front axle and the support torque provided on the rear axle is modified as a function of the actuation of the gas pedal, of the drag torque, and/or of the actuation of the brake pedal. To counteract an undesired change in the self-steering effect during load alternations, within the scope of the present invention, the torque distribution between the vehicle axles is modified as a function of the gas pedal actuation and/or the brake pedal actuation. In this manner, it is possible to ensure a satisfactory self-steering effect of the motor vehicle.

In routine driving, a first torque distribution between the support torque provided on the front axle and the support torque provided on the rear axle is preferably used, wherein when the first signal allows a conclusion to be drawn that the gas pedal position or the drag torque is above or below a threshold value, and/or the first signal allows a conclusion to be drawn that the gas pedal actuation speed or the drag torque speed, or the gas pedal actuation acceleration and/or the drag torque acceleration, exceeds a threshold value, and/or the second signal allows a conclusion to be drawn that the brake pedal is actuated, a second torque distribution is used for which the support torque provided on the front axle is greater compared to the first torque distribution.

This second torque distribution is maintained for a defined period of time. Following the defined period of time, a third torque distribution is used for which the support torque provided on the front axle is smaller compared to the second torque distribution. This period of time may be selected to be constant or, for example, to be a function of the drag torque and/or the driving state.

The device according to the invention for roll stabilization of a motor vehicle includes a device for measuring or calculating a transverse acceleration of the motor vehicle, and a control and regulation device, which on the basis of the measured or calculated transverse acceleration, generates actuating signals for actuators which are associated with a front axle and a rear axle of the motor vehicle and which provide support torques on the front axle and/or on the rear axle for roll stabilization. The control and regulation device includes a device for determining a torque distribution between the support torque provided on the front axle and the support torque provided on the rear axle on the basis of a first signal which allows conclusions to be drawn concerning the actuation of a gas pedal, and/or on the basis of a second signal which allows conclusions to be drawn concerning the actuation of a brake pedal.

Other objects, advantages and novel features of the present invention will become apparent from the following detailed description when considered in conjunction with the accompanying drawings.

DETAILED DESCRIPTION OF THE DRAWINGS

The present invention relates to a device and a method for roll stabilization of a motor vehicle, wherein roll is understood to mean a tilting motion of the motor vehicle about a roll axis. The roll axis is an axis which extends through the roll center of the front axle and the roll center of the rear axle. A roll center of an axle is the point on an imaginary perpendicular at the center of the axle at which the vehicle body begins to tilt under the effect of lateral forces.

A device for roll stabilization includes actuators associated with the front axle and/or rear axle. The actuators provide support torques on the front axle and rear axle for roll stabilization, namely, as a function of the driving state, which is characterized, for example, by a measured transverse acceleration or yaw rate or a calculated transverse acceleration or yaw rate of the motor vehicle. A device for roll stabilization is preferably designed as a hydraulic system, in which case the actuators associated with the front axle and the rear axle are designed as hydraulically displaceable stabilizers which may be actuated via valve blocks. A device for roll stabilization may also be designed, for example, as an electrical or electrohydraulic system. The stabilizers may also be designed to be electrically displaceable, for example.

Figure 1:
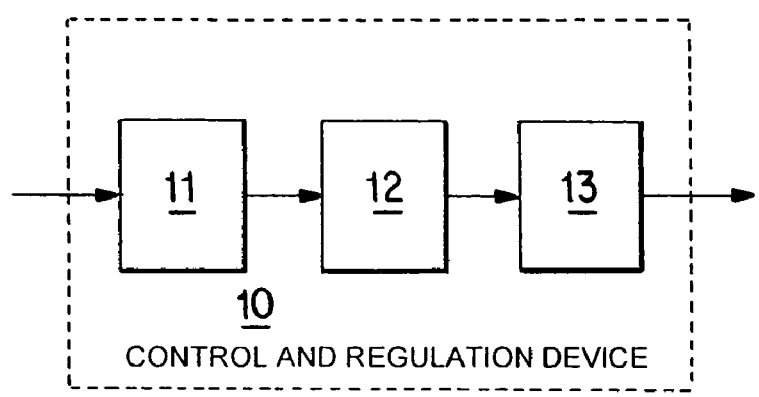
FIG. 1 is a general block diagram of a device according to the invention for roll stabilization of a motor vehicle.

Actuating signals for actuating the valve blocks are generated by a control and regulation device, namely, on the basis of the measured transverse acceleration or yaw rate or the calculated transverse acceleration or yaw rate of the motor vehicle. FIG. 1 shows a section of a device for roll stabilization, namely, a control and regulation device 10, which receives at least the measured transverse acceleration and/or yaw rate or the calculated transverse acceleration and/or yaw rate of the motor vehicle as input variables. The control and regulation device 10 issues control commands for the actuators, in particular hydraulically displaceable stabilizers for valve blocks, as output variables. The roll angle is also preferably sent to the control and regulation device 10 as an input variable.

According to FIG. 1, the control and regulation device 10 comprises three primary components, namely, a pilot control device 11, a regulating device 12, and a device 13 for determining a torque distribution between a support torque provided on the front axle and a support torque provided on the rear axle. The pilot control device 11 generates from the measured transverse acceleration or yaw rate (or the calculated transverse acceleration or yaw rate) of the motor vehicle a pilot control component for the roll stabilization, and the regulating device 12 corrects incorrect entries of the pilot control by way of regulation.

On the basis of the pilot control via the pilot control device 11 and the regulation via the regulating device 12, the device 13 determines a torque distribution between the support torque provided on the front axle and the support torque provided on the rear axle for roll stabilization of the motor vehicle. The present invention now addresses details of the device 13, by which undesired changes in the self-steering effect of the motor vehicle may be avoided despite alternations in load.

In the sense of the present invention, to avoid an undesired change in the self-steering effect of the motor vehicle during load alternations, and thus to ensure a satisfactory self-steering effect of the motor vehicle, a torque distribution between the support torque provided on the front axle and the support torque provided on the rear axle is modified on the basis of a first signal, which allows conclusions to be drawn concerning the actuation of the gas pedal or the drag torque of the motor vehicle, and/or on the basis of a second signal which allows conclusions to be drawn concerning the actuation of a brake pedal of the motor vehicle. This change is described in greater detail below with reference to FIG. 2.

Figure 2:
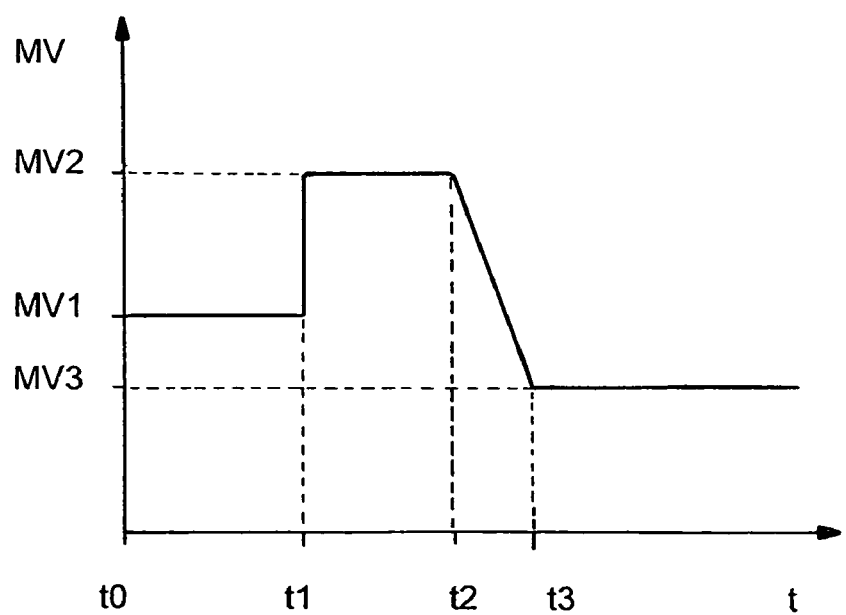
FIG. 2 is a graphical diagram illustrating the method according to the invention for roll stabilization of a motor vehicle.

FIG. 2 illustrates, by way of example, a change in the torque distribution between the support torque provided on the front axle and the support torque provided on the rear axle which may be achieved by the present invention. In FIG. 2, the time t is plotted on the horizontal axis and the torque distribution MV is plotted on the vertical axis. The torque distribution MV is the ratio of the support torque provided on the front axle to the support torque provided on the rear axle. The greater the torque distribution MV, the greater the support torque provided on the front axle in relation to the support torque provided on the rear axle.

In routine driving, the device 13 provides a first torque distribution between the support torque provided on the front axle and the support torque provided on the rear axle. This first torque distribution is illustrated in FIG. 2 as MV1, which is provided by the device 13 and used for roll stabilization, for example, between times t0 and t1.

When the first signal allows a conclusion to be drawn that the gas pedal position or the drag torque is above or below a threshold value, and/or when the first signal allows a conclusion to be drawn that the gas pedal actuation speed or the drag torque, and/or the gas pedal actuation acceleration, exceeds a threshold value, and/or when the second signal allows a conclusion to be drawn that the brake pedal is actuated, the device 13 uses or provides a second torque distribution for which the support torque provided on the front axle is greater compared to the first torque distribution. This second torque distribution is represented by MV2 in FIG. 2.

According to FIG. 2, the transition from the first torque distribution MV1 to the second torque distribution MV2 occurs discontinuously, i.e., in an abrupt manner in one step. The transition may also occur continuously according to any given defined function. The second torque distribution MV2 is maintained for a defined period of time, namely, for the time period between times t1 and t2.

This time period, t1 to t2, in particular, lasts for several seconds. The percentage increase between torque distributions MV1 and MV2 is between 2 and 5 percent, preferably between 3 and 4 percent.

Following the defined period of time for which the second torque distribution MV2 is maintained, the device 13 provides or uses a third torque distribution, for which in comparison to the second torque distribution the support torque provided on the front axle is smaller.

In FIG. 2, this third torque distribution is torque distribution MV3, which is applicable beginning at time t3. According to FIG. 2, the transition from the second torque distribution MV2 to the third torque distribution MV3 between times t2 and t3 occurs continuously, i.e., in a linear manner. The transition from the second torque distribution MV2 to the third torque distribution MV3 may occur according to any given function.

In the exemplary embodiment illustrated, for the third torque distribution MV3, the support torque provided on the front axle is smaller compared to the first torque distribution MV1. However, the support torque provided on the front axle by way of the third torque distribution MV3 may also be equal to or greater than the first torque distribution MV1.

The first signal allows conclusions to be drawn concerning the actuation of the gas pedal or the drag torque, in particular concerning the gas pedal position or drag torque, or the gas pedal actuation speed or the increased drag torque, or the gas pedal acceleration or the increased drag torque acceleration. This first signal may be generated by a gas pedal sensor, which directly monitors the gas pedal. Alternatively, a signal regarding a throttle valve position or a signal regarding an engine torque demand may be used as the first signal which allows conclusions to be drawn concerning the actuation of the gas pedal.

A brake pedal signal generated by a sensor associated with the brake pedal is preferably used as a second signal, which allows conclusions to be drawn concerning the actuation of the brake pedal.

Accordingly, in the sense of the present invention, to avoid an undesired change in the self-steering effect during load alternations, for roll stabilization the torque distribution between the support torque provided on the front axle and the support torque provided on the rear axle is modified as a function of the gas pedal actuation and/or the brake pedal actuation.

When the brake pedal is actuated, and/or the gas pedal position is above or below a defined value, and/or a gas pedal actuation speed or gas pedal actuation acceleration is exceeded, the torque distribution between the support torque provided on the front axle and the support torque provided on the rear axle is modified by shifting the torque distribution to the front axle, specifically, for a defined time period in which this modified torque distribution is maintained. Following this time period, the torque distribution is shifted back toward the rear axle.

Lastly, it is noted that the torque distributions MV1, MV2, and MV3 are preferably constant torque distributions. However, the torque distribution MV1 may, in particular, be a function of the driving situation, in particular the driving speed. Likewise, torque distributions MV2 and MV3 may also be a function of the driving situation.

TABLE OF REFERENCE NUMERALS

10 Control and regulation device
11 Pilot control device
12 Regulation device
13 Device for determining a torque distribution The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for roll stabilization of a motor vehicle, the method comprising the acts of:
generating actuating signals for front and rear actuators respectively associated with a front axle and a rear axle of the motor vehicle on a basis of a measured transverse acceleration or a calculated transverse acceleration of the motor vehicle, the front actuator providing a support torque on the front axle and the rear actuator providing a support torque on the rear axle to provide roll stabilization;
during routine driving of the motor vehicle, utilizing a first torque distribution between a support torque provided by the front actuator on the front axle and the support torque provided by the rear actuator on the rear axle;
modifying a torque distribution between the support torque provided on the front axle and the support torque provided on the rear axle to ensure a satisfactory self-steering effect of the motor vehicle dependent upon at least one of a first signal or a second signal, the first signal allowing conclusions to be drawn concerning an actuation of a gas pedal, the second signal allowing conclusions to be drawn concerning an actuation of a brake pedal;
generating the first signal from a sensor assigned to the gas pedal;
generating the second signal from a sensor assigned to the brake pedal;
if the first signal allows a conclusion to be drawn that a position of the gas pedal is less than a threshold value, using a second torque distribution between the support torque provided on the front axle and the support torque provided on the rear axle for which the support torque provided on the front axle is greater in comparison to the first torque distribution;
if the second signal allows a conclusion to be drawn that the brake pedal is actuated, using the second torque distribution for which the support torque provided on the front axle is greater in comparison to the first torque distribution;
performing a transition from the first torque distribution to the second torque distribution discontinuously or continuously in one step and maintaining. the second torque distribution for a defined period of time; and
subsequently to the defined period of time of the second torque distribution, using a third torque distribution between the support torque provided on the front axle and the support torque provided on the rear axle for which the support torque provided on the front axle is smaller, equal or greater in comparison to the first torque distribution and the transition from the second torque distribution to the third torque distribution occurs linearly.

2. The method according to claim 1, wherein when the first signal allows a conclusion to be drawn that an actuation speed or actuation acceleration of the gas pedal exceeds a threshold value, the second torque distribution is used for which the support torque provided on the front axle is greater in comparison to the first torque distribution.

3. The method according to claim 1, wherein the first signal is one of a gas pedal signal, a throttle valve signal, and an engine torque demand signal, the first signal allowing conclusions to be drawn concerning the actuation of the gas pedal.

4. The method according to claim 1, wherein the second signal is a brake pedal signal which allows conclusions to be drawn concerning the actuation of the brake pedal.

5. The method according to claim 1, wherein each of the front and rear actuators are hydraulically displaceable stabilizers.

* * * * *